(12) United States Patent
Oumedian

(10) Patent No.: US 6,612,658 B1
(45) Date of Patent: Sep. 2, 2003

(54) TROLLEY CART WHEEL-AXLE ASSEMBLY

(76) Inventor: Harry Oumedian, 10654 Latson Rd., Howell, MI (US) 48843

( * ) Notice: Subject to any disclaimer, the term of this patent is extended or adjusted under 35 U.S.C. 154(b) by 0 days.

(21) Appl. No.: 10/010,758

(22) Filed: Nov. 7, 2001

Related U.S. Application Data

(60) Provisional application No. 60/246,346, filed on Nov. 7, 2000.

(51) Int. Cl.[7] .................... A63C 17/22; B60B 23/00; F16C 13/00; F16C 35/00; A47B 91/00
(52) U.S. Cl. .................... 301/111.06; 301/5.7; 301/113; 301/115; 384/585; 384/906; 16/47
(58) Field of Search ............... 301/5.305, 5.7, 301/111.01, 111.03, 111.061, 114, 115, 117, 111.04, 131; 411/84, 85, 115, 116, 117, 118, 119, 120, 121; 384/537, 542, 585, 906; 16/18 R, 40, 46, 47

(56) References Cited

U.S. PATENT DOCUMENTS

| | | | | | |
|---|---|---|---|---|---|
| 980,607 | A | * | 1/1911 | Copenhaver et al. | 301/5.7 |
| 2,181,301 | A | * | 11/1939 | Geddes | 411/119 |
| 2,392,633 | A | * | 1/1946 | Bierman | 301/5.7 |
| 4,734,001 | A | * | 3/1988 | Bennett | 411/119 |
| 5,178,472 | A | * | 1/1993 | Lawson | 384/537 |
| 5,271,633 | A | * | 12/1993 | Hill, Jr. | 280/11.223 |
| 5,362,075 | A | * | 11/1994 | Szendel | 280/11.223 |
| 5,482,383 | A | * | 1/1996 | Gantt et al. | 384/513 |
| 5,800,022 | A | * | 9/1998 | Del Rosario | 301/5.306 |
| 5,853,227 | A | * | 12/1998 | Schmidt, III | 301/5.7 |
| 6,142,578 | A | * | 11/2000 | Pawlowski et al. | 301/5.7 |
| 6,494,622 | B2 | * | 12/2002 | Plesh, Sr. | 384/542 |

* cited by examiner

*Primary Examiner*—S. Joseph Morano
*Assistant Examiner*—Jason R. Bellinger
(74) *Attorney, Agent, or Firm*—John R. Benefiel

(57) ABSTRACT

A heavy duty wheel-axle assembly for industrial trolley carts in which wheel assemblies are mounted at either end of an axle, an inner bearing race of each wheel positively non-rotationally secured to the axle by interengagement of a non-round shaped position of the axle fitting into a corresponding opening in the race. A hex shape on one end is used to fix one wheel assembly, held by a bolt threaded into a threaded axial bore in the one end of the axle. A pin is inserted into one of a series of axial hub in the hub outside face to engage one side of the bolt hex head. A tee head on the other end of the axle is fit into a recess in the outside face of the other but to establish a non-rotative connection.

5 Claims, 4 Drawing Sheets

TROLLEY CART WHEEL-AXLE ASSEMBLY

CROSS-REFERENCE TO RELATED APPLICATION

The application claims the benefit of U.S. Ser. No. 60/246,346, filed Nov. 7, 2000.

BACKGROUND OF THE INVENTION

The invention concerns wheel assemblies for industrial trolley carts as of a type commonly used in the automotive industry.

Ball bearings are widely used for wheels used in conveyor trolley carts which hold automobile bodies during the assembly process. In current designs, an axle shaft is swaged to an inner bearing race acting as a wheel hub in a design, such design is in wide use in the industry. Sometimes the swaging fails under the demanding service conditions encountered, and the axle shaft turns in the inner race, leading to bearing failure. The wheels must support heavy loads and often operate in harsh environments, but the wheel bearings desirably should operate very reliably under heavy loading over long service periods to avoid costly disruptions to the production process.

It is the object of the present invention to provide a heavy duty wheel assembly suitable for use in this application which very reliable and has a very long service life.

SUMMARY OF THE INVENTION

The present invention comprises a wheel assembly including an axle having a much more durable non-rotative connection between the axle shaft and an inner bearing race acting as a wheel hub in the current design. One end of the axle shaft has a hex shape machined on one end, slidably received in a complementary non-round hex opening in the inner race acting as a wheel hub of a first wheel assembly. A heavy duty bolt is received in a threaded bore extending axially into the end of the axle shaft. A series of roll pin holes are drilled axially into the hub outside face located so that at least one hole lies adjacent one side of the bolt hex head. A roll pin is inserted after the bolt is installed protruding to prevent the bolt from unscrewing.

An outer race/wheel is assembled over the hub and ball bearings loaded into the intervening annular space through a scallop on the outer race/wheel, and also on the inner race hub. A retainer ring is pressed onto a diameter of the hub to secure the balls.

A tee head at the opposite end of the shaft is received in a recess in the outside face of a hub of a second wheel assembly to establish a positive rotational connection between the axle and the hub-inner race of a second wheel assembly.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
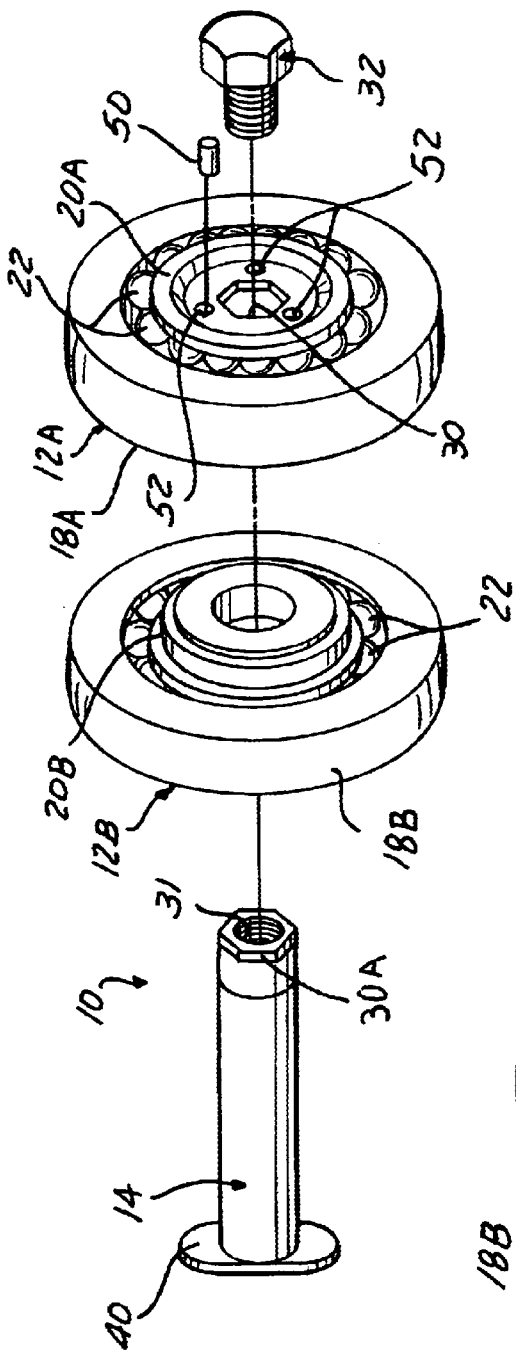
FIG. 1 is an exploded perspective view of a trolley cart wheel-axle assembly according to the present invention.
Figure 2A:
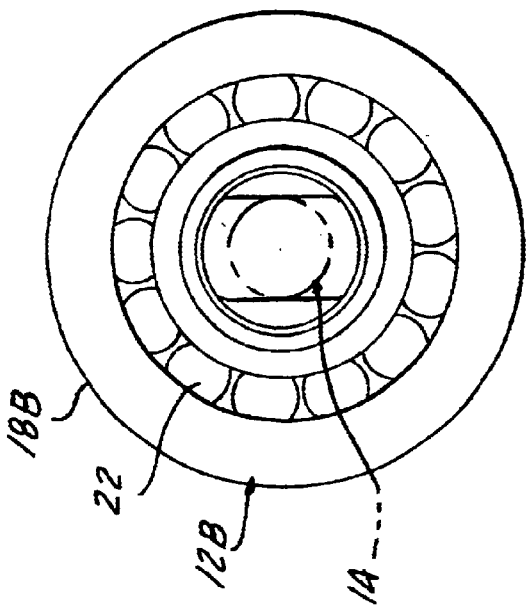
FIG. 2A is a left end view of the trolley cart wheel-axle assembly shown in FIG. 2.
Figure 2:
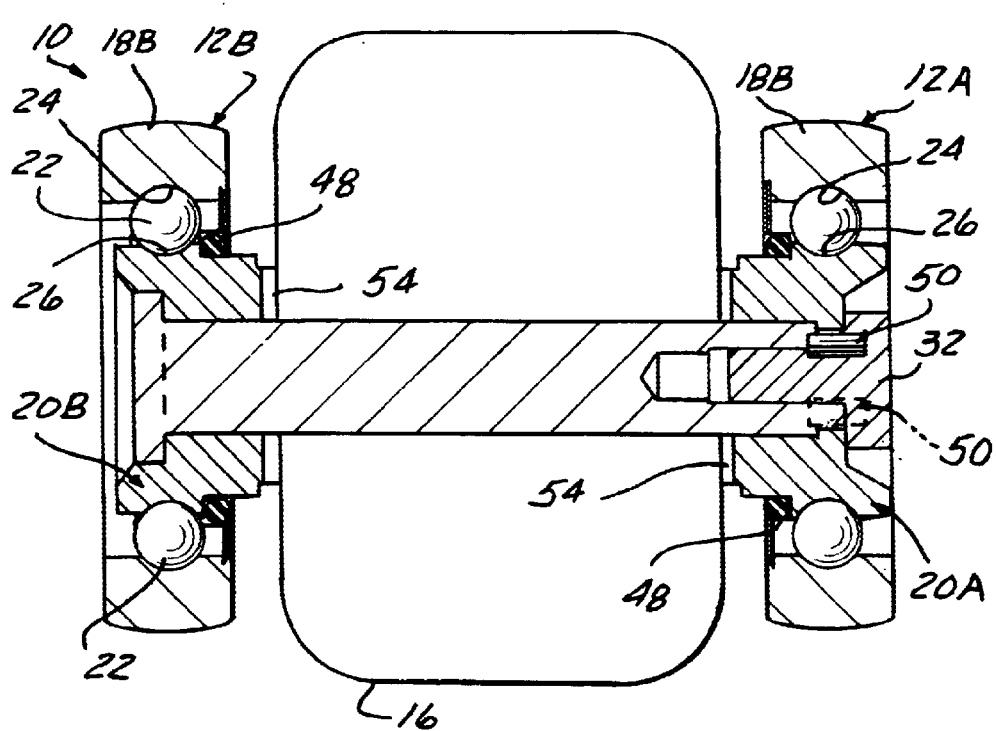
FIG. 2 is a lengthwise sectional view of the trolley cart wheel-axle assembly shown in FIG. 1, with a portion of the trolley car structure shown.

Referring to the Drawings, and particularly FIGS. 1 and 2, the trolley cart wheelaxle assembly 10 according to the present invention includes a pair of wheels 12A, 12B mounted to an axle 14 so as to provide rolling support for a trolley cart, interposed portion 16 shown in FIG. 2.

Each wheel 12A, 12B includes an identical rim-outer race 18A, 18B having a slightly convex outer diameter adapted to run on a supporting surface (not shown) in conventional fashion.

A left hub-inner race 20A and right hub-inner race 20B are disposed within a respective rim-outer race 18A, 18B with interposed chrome plated ball bearings 22 running in machined races 24, 26 in the rim-outer races 18A, 18B and hub-inner races 20A, 20B, respectively.

Figure 3:
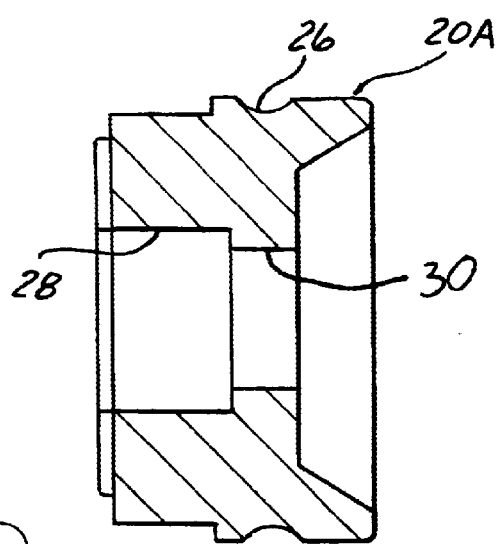
FIG. 3 is a sectional view through the right hand hub-inner race included in the wheel-axle assembly shown in FIGS. 1 and 2.
Figure 4:
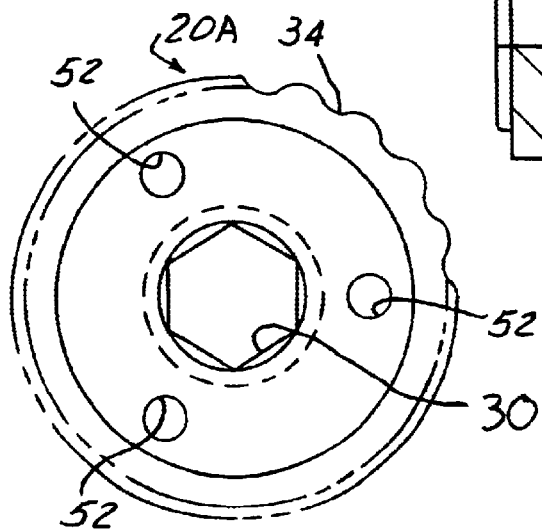
FIG. 4 is an end view of the right hand hub shown in FIG. 3.
Figure 5:
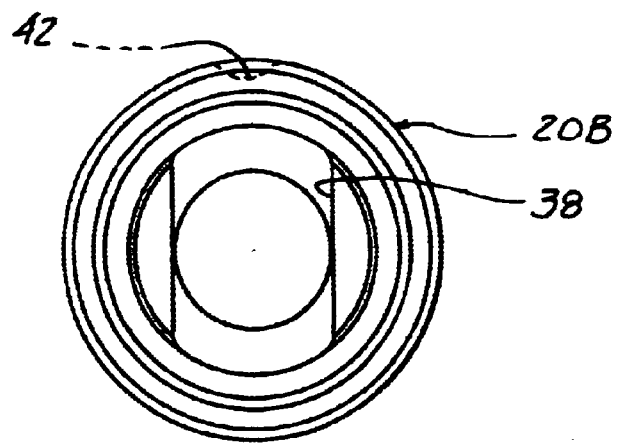
FIG. 5 is an end view of the left hand hub-inner race included in the wheel axle assembly shown in FIGS. 1 and 2

The right hub-inner race 20A (FIG. 3) has an internal bore 28 slidably receiving the right end of the axle 14, with an adjacent non-round complementary hex opening mating with a non-round hex shape 30A formed on the right tip of the axle 14 to create a non rotatable connection therebetween when mated. An axial threaded hole 31 is formed extending into right end face of the axle 14 adapted to threadably receive a stress hex headed bolt 32 with a right hand thread. A scallop 34 is formed into the left side of the race 26 to enable loading of the ball bearing 22.

Figure 6:
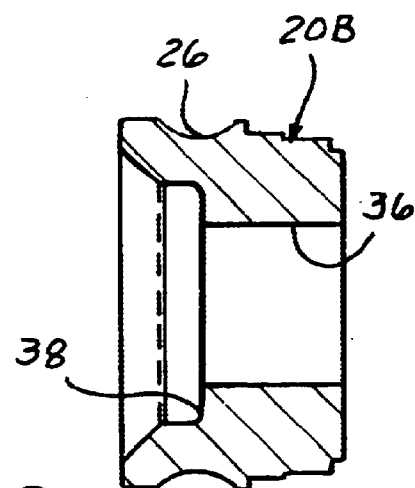
FIG. 6 is a sectional view taken through the hub-inner race shown in FIG. 5.
Figure 7:
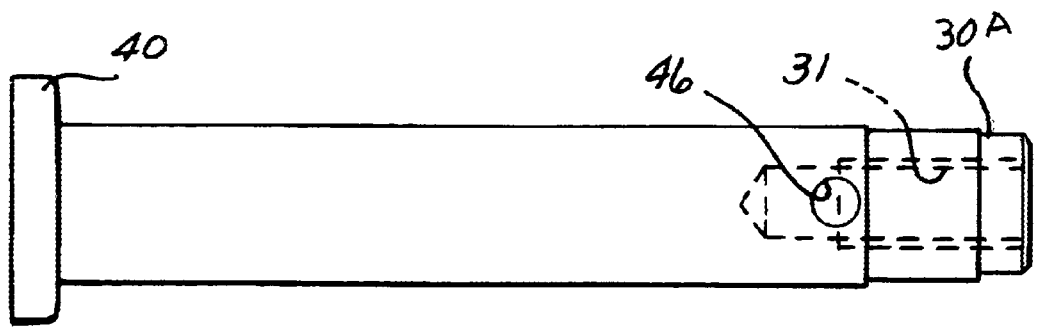
FIG. 7 is a slightly enlarged front view of the axle included in the wheel-axle assembly shown in FIGS. 1 and 2.
Figure 8:
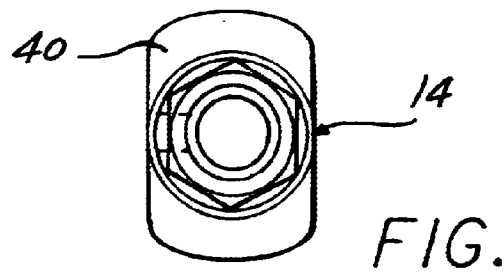
FIG. 8 is a left end view of the axle shown in FIG. 7.

The left hub-inner race 20B (FIG. 6) is also formed with a bore 36 slidably receiving the left end of the axle 14, with a non-round tee pocket 38 machined into the left hub face configured to receive a non-round tee head 40 on the left end of the axle 14 to establish a non-rotative connection thereto when mated. A scallop 42 is also provided as with the right hand hub-inner race 20A.

Figure 9:
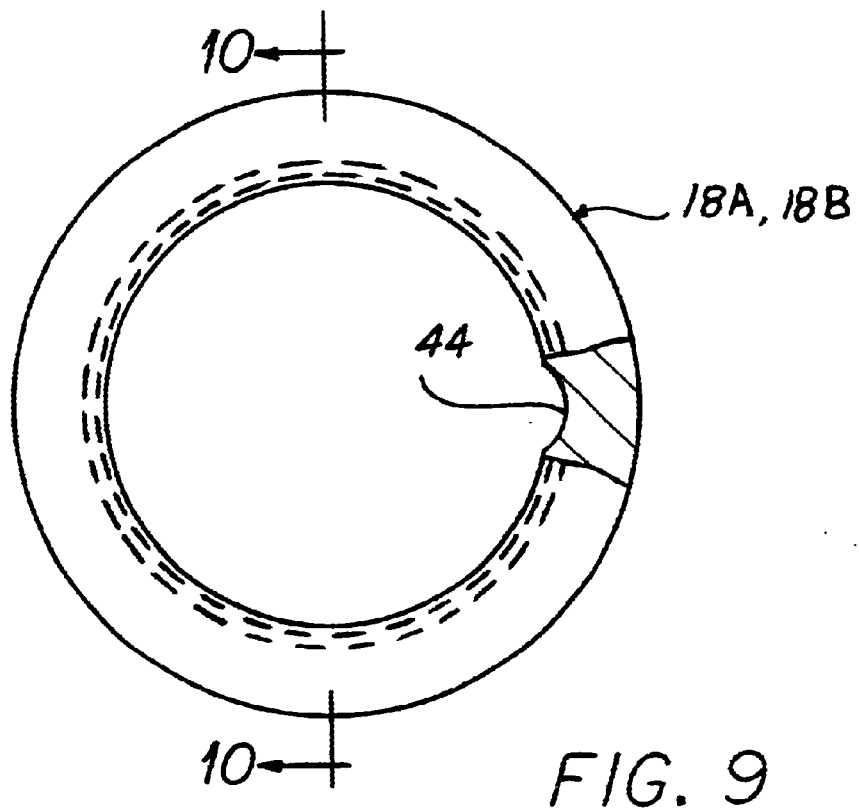
FIG. 9 is a front view of one of the rim-outer races shown partially broken away.
Figure 10:
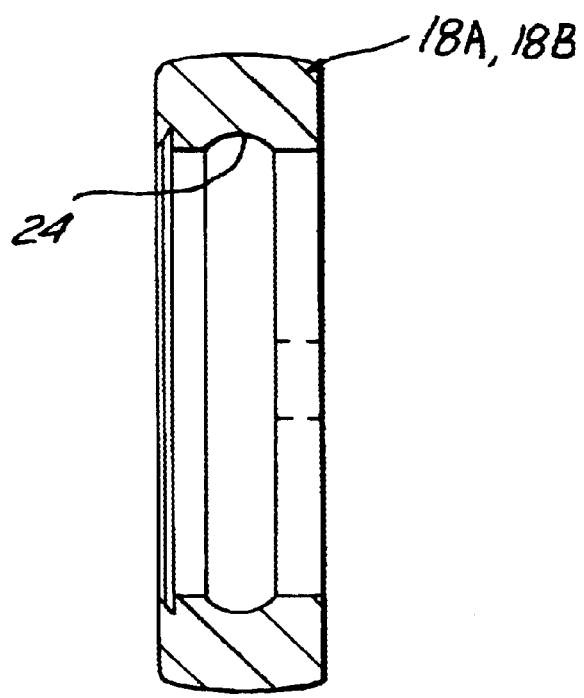
FIG. 10 is a sectional view of the rim-outer race shown in FIG. 9.

The rim outer races 18A, 18B are also each formed with a scoop 44 (FIG. 9) which, with the scallops 34, 42 of the hubs 20A, 20B allow the ball bearings 22 to be loaded into the annular spaces between the rim outer tracks 24 (FIG. 10) and the hub inner tracks 34, 42. Retainer rings 48 are pressed onto the inside of hub interior ends to keep the ball bearings 22 from falling back out.

The shaft 14 has a cross hole 46 drilled adjacent the left end to receive a pin received in a slot (not shown) in the trolley cart part 16 to capture the axle 14 thereon.

The hex head of the bolt 32 is engaged by a protruding end of a pin 50 driven into the one of three axial holes 52 drilled into the right hub-inner race which is closest to a hex head side 54 after the bolt 32 is tightened, preventing the bolt 32 from turning so as to loosen.

A pair of thrust washers 54 (FIG. 2) are interposed between each side of the trolley cart part 16 and the inside end of the right hub-inner race 20A and the left hub-inner race 20A and the left hub-inner race 20B. The left hub-inner race 20B thus is captured on the axle 14.

These hubs, rims and axles are preferably formed of hardened 4140 alloy steel (RC 39-58 RC axle 28-32 RC) to be resistant to wear, and the races 24, 26 may optionally be plated with chrome nitride to be even more wear resistant. Other materials, heat treating and coatings may also be employed.

Instead of the tee feature 40, a hex end and second bolt could be employed to mount the left wheel assembly 12B.

What is claimed is:

1. A cart wheel-axle assembly for support of a trolley cart, comprising:

an axle;

a pair of wheel assemblies each mounted at a respective end of said axle with a trolley cart part interposed therebetween;

each wheel assembly including a hub having a bore receiving one end of said axle, each end of said axle having a non-round shape formed thereon mating with a complementary non-round recess in the respective mating hub to prevent relative rotation therebetween;

a headed element at each end of said axle preventing movement of said mating hub off the respective axle end;

each wheel assembly also including a rim received over the respective hub with an annular space therebetween defined by an inner race on an outside surface of each hub and an outer race on an inside surface of each rim with a series of rolling bearing elements interposed therebetween.

2. The assembly according to claim 1 wherein said non-round shape on one of said axle ends comprises a hex shaped tip end thereof received in a hex opening in the hub mating with said axle one end, said hex opening comprising said complementary nonround recess therein.

3. The assembly according to claim 2 wherein said headed element comprises a hex headed bolt threaded into a threaded bore extending axially into said one axle end.

4. The assembly according to claim 3 further including a series of axial holes in said hub mating with said one axle end disposed about the periphery of said bolt head, and a pin inserted in one hole protruding alongside one side of said hex head on said bolt to prevent loosening rotation of said hex bolt in said threaded bore.

5. The assembly according to claim 3 wherein said non-round shape on an opposite end of said axle from said one end comprises a tee head on said opposite end of said axle, said tee head received in a complementary recess in an outside face of a hub mated with said opposite end of said axle, an inside face of each of said hubs engaging said trolley cart part to be prevented from moving away from said mating axle end in either direction.

* * * * *